(12) United States Patent
Eccher et al.

(10) Patent No.: US 8,456,146 B2
(45) Date of Patent: Jun. 4, 2013

(54) SYSTEMS AND METHODS FOR SWITCHED MODE POWER AMPLIFICATION

(75) Inventors: Joseph A. Eccher, Rio Rancho, NM (US); Thomas Michael Love, Albuquerque, NM (US)

(73) Assignee: Goodrich Corporation, Charlotte, NC (US)

( * ) Notice: Subject to any disclaimer, the term of this patent is extended or adjusted under 35 U.S.C. 154(b) by 322 days.

(21) Appl. No.: 12/970,430

(22) Filed: Dec. 16, 2010

(65) Prior Publication Data

US 2012/0153911 A1 Jun. 21, 2012

(51) Int. Cl.
*G05F 1/40* (2006.01)

(52) U.S. Cl.
USPC .......................................................... 323/282

(58) Field of Classification Search
USPC .......................................... 323/282–285, 351
See application file for complete search history.

(56) References Cited

U.S. PATENT DOCUMENTS

| | | | | |
|---|---|---|---|---|
| 5,646,513 | A * | 7/1997 | Riggio, Jr. | 323/285 |
| 7,170,273 | B2 * | 1/2007 | Sase et al. | 323/285 |
| 7,183,842 | B1 * | 2/2007 | Wai et al. | 330/98 |
| 7,834,702 | B2 * | 11/2010 | Jones et al. | 330/297 |
| 8,138,837 | B2 * | 3/2012 | Jones et al. | 330/297 |

* cited by examiner

*Primary Examiner* — Adolf Berhane
(74) *Attorney, Agent, or Firm* — Snell & Wilmer L.L.P.

(57) ABSTRACT

Systems and methods for switched mode power amplification are disclosed herein. A circuit is provided comprising an amplifier network, a DC translation stage for receiving input voltage from the amplifier network and for providing an output voltage to a voltage boost circuit, and a feedback network for providing feedback from the voltage boost circuit to the amplifier network.

14 Claims, 7 Drawing Sheets

US 8,456,146 B2

SYSTEMS AND METHODS FOR SWITCHED MODE POWER AMPLIFICATION

GOVERNMENT LICENSE RIGHTS

These inventions were made with government support under contract N00030-07-C-0100 awarded by the United States Department of the Navy. The government has certain rights in the inventions.

FIELD

The present disclosure is related to systems and methods for switched mode power amplification.

BACKGROUND

Voltage boost circuits may be useful in a variety of applications where DC voltage conversion and/or amplification are needed or desirable. For example, a voltage boost circuit may be used in the context of a DC to AC voltage inverter. An inverter may comprise a voltage boost circuit that feeds an H bridge to produce an AC square wave output. A filter may then be used to attenuate the AC square wave, producing a low distortion AC output. The voltage boost circuit may conventionally comprise a hysteretic voltage boost circuit or a pulse width modulation ("PWM") approach. However, if not equipped with the proper control topology, these approaches can produce poor bandwidth, line regulation, and load regulation, among other characteristics. If, instead of conventional control topologies, the voltage boost circuit is paired with an amplifier network, among other components, to produce a switched mode power amplification circuit, superior performance may be achieved.

SUMMARY

Systems and methods disclosed herein may be useful for switched mode power amplification. A circuit may comprise an amplifier network, a DC translation stage, and a feedback network, and may provide feedback from the voltage boost circuit to the amplifier network. The DC translation stage may receive input voltage from the amplifier network and may provide an output voltage to a voltage boost circuit A method may comprise receiving a DC feedback voltage and a DC control voltage at an amplifier network, passing an output DC voltage from the amplifier network to a DC translation stage, and passing the DC translation stage output to a voltage boost circuit. The amplifier network may comprise an amplifier and a plurality of resistors.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, electrical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for switched mode power amplification. Such systems and methods may be useful in any application where power conversion is desired.

Figure 1:
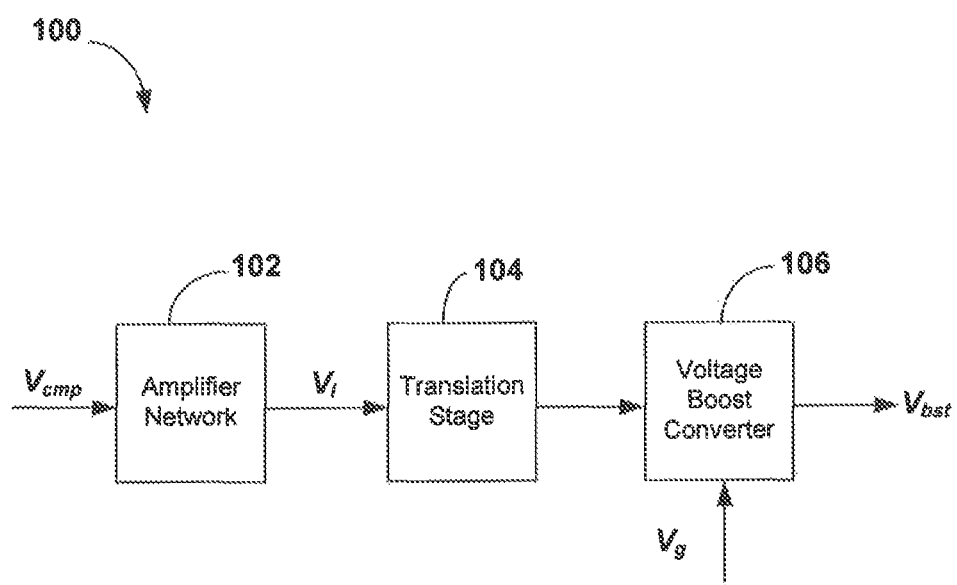
FIG. 1 illustrates a functional representation of an embodiment.

With reference to FIG. 1, an embodiment of a switched mode power amplification circuit 100 is illustrated. As shown in FIG. 1, amplifier network 102 receives DC input voltage $V_{cmp}$. Amplifier network 102 may also receive DC feedback voltage. Amplifier network 102 produces voltage output $V_i$ that is in turn received by translation stage 104. Translation stage 104 produces an output voltage to voltage boost converter 106. Voltage boost converter 106 also receives input voltage $V_g$ and outputs voltage $V_{bst}$. In various embodiments, $V_g$ may be a high power and/or high voltage source. As is evident by FIG. 1, switched mode power amplification circuit 100 receives $V_{cmp}$ and $V_g$ and produces $V_{bst}$.

Amplifier network 102 comprises at least one amplifier and at least one resistor. Various quantities, characteristics and configurations of amplifiers and resistors in amplifier network 102 are contemplated herein, though it is understood that the selection of the quantity, characteristics, and configuration of the amplifier(s) and resistor(s) of amplifier network 102 may affect the performance characteristics of switched mode power amplification circuit 100 and may also affect the mathematical modeling of switched mode power amplification circuit 100. Thus, it should be understood that the particular composition of amplifier network 102 may make the associated mathematical models more or less complex. In various embodiments, amplifier network 102 comprises two amplifiers and seven resistors.

Translation stage 104, which may also be referred to as a DC translation stage, may comprise components for translating DC current. Translation may comprise a mapping of an input voltage to a specific, limited output voltage. For example, the translation stage may receive an input that varies by plus or minus about 15 V and output a voltage that varies only by between about 1 V and about 4 V. Such input and output ranges are exemplary in nature, and it should be understood that any input or output voltages are contemplated herein. Translation stage 104 may comprise one or more resistor attenuators. In embodiments where translation stage 104 comprises resistor attenuators, one or more of the resistor attenuators may be biased. In various embodiments, translation stage 104 may also be configured to receive, from a current sensor, a voltage representative of a voltage source of voltage boost converter 106. For example, as also described herein, $V_g$ may pass through an inductor of voltage boost converter 106. A current sense device (also referred to as a current sensor or I sense) may forward a voltage representative of $V_g$ to a resistor attenuator of translation stage 104.

In various embodiments, $V_i$ may be input into translation stage 104. For example, the translation stage 104 may comprise two biased resistor attenuators with one resistor attenuator receiving $V_i$ and one resistor attenuator receiving a voltage representative of $V_g$ from, for example, a current sense device. Translation stage 104 may produce output configured to cause voltage boost converter 106 to boost the ouput voltage $V_{bst}$.

Voltage boost converter 106 may comprise any voltage boost circuit. For example, voltage boost converter 106 may comprise a hysteretic boost function, a PWM-controlled boost function, or any other manner of voltage boost circuitry (e.g., "boost," "buck," "buck boost," etc).

In various embodiments, voltage boost converter 106 comprises a hysteretic boost circuit comprising a comparator and an inductor. The inductor of voltage boost converter 106 may receive $V_g$. A current sensor may produce a voltage representative of $V_g$, which may in turn be fed back to translation stage 104 prior to entry into a comparator of voltage boost converter 106. In various embodiments, voltage boost converter 106 comprises one or more comparators that receive input voltages from the amplifier network (such as $V_i$) and from $V_g$. The one or more comparators may operate a switch based upon the input voltages from translation stage 104. Voltage boost converter 106 may further comprise one or more capacitors and resistors.

Figure 2:
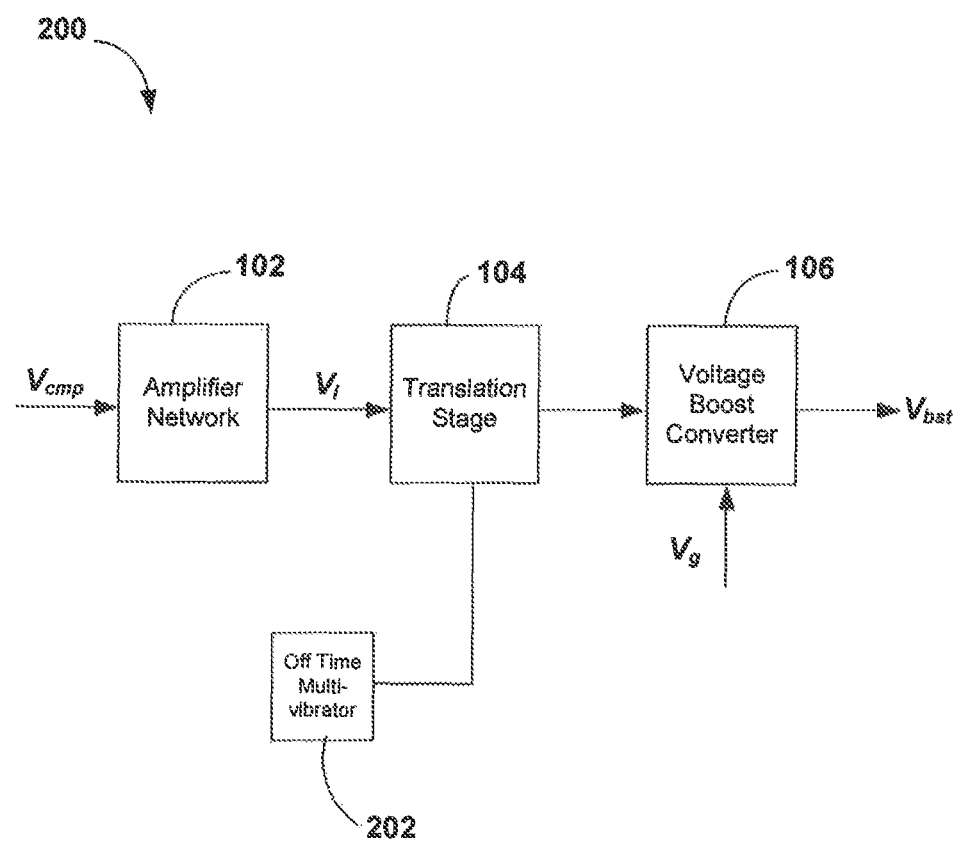
FIG. 2 illustrates an additional functional representation of an embodiment having an off-time multivibrator.

With reference to FIG. 2, an embodiment of a switched mode power amplification circuit 200 is illustrated. As shown in FIG. 2, amplifier network 102 receives DC input voltage $V_{cmp}$. Amplifier network 102 produces voltage output $V_i$ that is in turn received by translation stage 104. In an exemplary embodiment, translation stage 104 is also in electrical communication with off-time multivibrator 202. Translation stage 104 produces an output voltage which may be communicated to voltage boost converter 106. Voltage boost converter 106 also receives input voltage $V_g$ and outputs voltage $V_{bst}$. As is evident by FIG. 2, switched mode power amplification circuit 100 receives $V_{cmp}$ and $V_g$ and produces $V_{bst}$.

Off-time multivibrator 202 provides performance benefits, especially when used in embodiments having a voltage boost converter 106 comprising a hysteretic boost circuit. In such embodiments, off-time multivibrator 202 may modulate the input to the translation stage 104. Off-time multivibrator 202 also ensures that boost occurs by preventing saturation of the boost inductor. This is helpful as, in conjunction with voltage boost converter 106, if the current feedback cannot become as large as a commanded current, the circuit may lock, thereby commanding the boost's active switch to be on continuously, which causes inductor saturation and degrades performance. In addition, off-time multivibrator 202 provides regular off-time and more regular switching frequency in embodiments where a hysteretic voltage boost is used, as conventional hysteretic voltage boost circuits do not operate on a regular frequency or with guaranteed dead-time, making dead-time and frequency of operation difficult to predict. In embodiments having off-time multivibrator 202, the frequency regulating effect is improved as load increases. Switched mode power amplification circuit 200 thus provides the benefits associated with use of off-time multivibrator 202.

Figure 3:
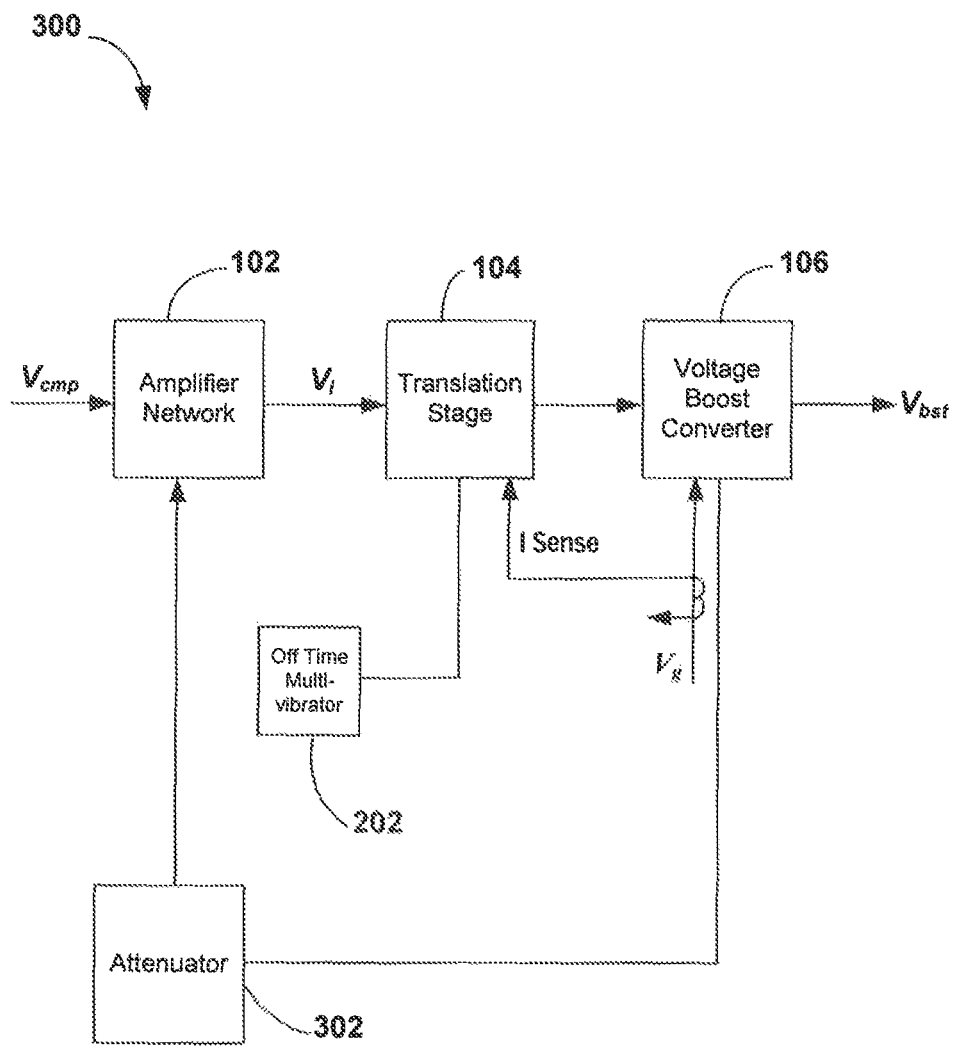
FIG. 3 illustrates an additional functional representation of an embodiment having an off-time multivibrator and an attenuator.

With reference to FIG. 3, an embodiment of a switched mode power amplification circuit 300 is illustrated. As shown in FIG. 3, amplifier network 102 receives $V_{cmp}$. Amplifier network 102 produces voltage output $V_i$ that is in turn received by translation stage 104. In an exemplary embodiment, translation stage 104 is also in electrical communication with off-time multivibrator 202. Off-time multivibrator 202 may thus modulate the input to translation stage 104. Translation stage 104 produces an output voltage which may be communicated to voltage boost converter 106. Voltage boost converter 106 also receives input voltage $V_g$ and outputs voltage $V_{bst}$. A current sensor (shown as "I sense" in FIG. 3) may sense the current of input voltage $V_g$ and provide a representation of input voltage $V_g$ into translation stage 104. Attenuator 302 may be in electrical communication with voltage boost converter 106. Attenuator 302 may also be in electrical communication with amplifier network 102 to provide DC feedback voltage. As is evident by FIG. 3, switched mode power amplification circuit 300 receives $V_{cmp}$ and $V_g$ and produces $V_{bst}$.

Attenuator 302 may be any attenuator device. Attenuator 302 may provide waveform information to amplifier network 102. The gain of attenuator 302 may be selected from any suitable gain, from about below 0.99 to about 0.01, though any suitable gain may be appropriate. Preferably, a gain of about 0.0625 (i.e., 1/16) may be used.

Figure 4:
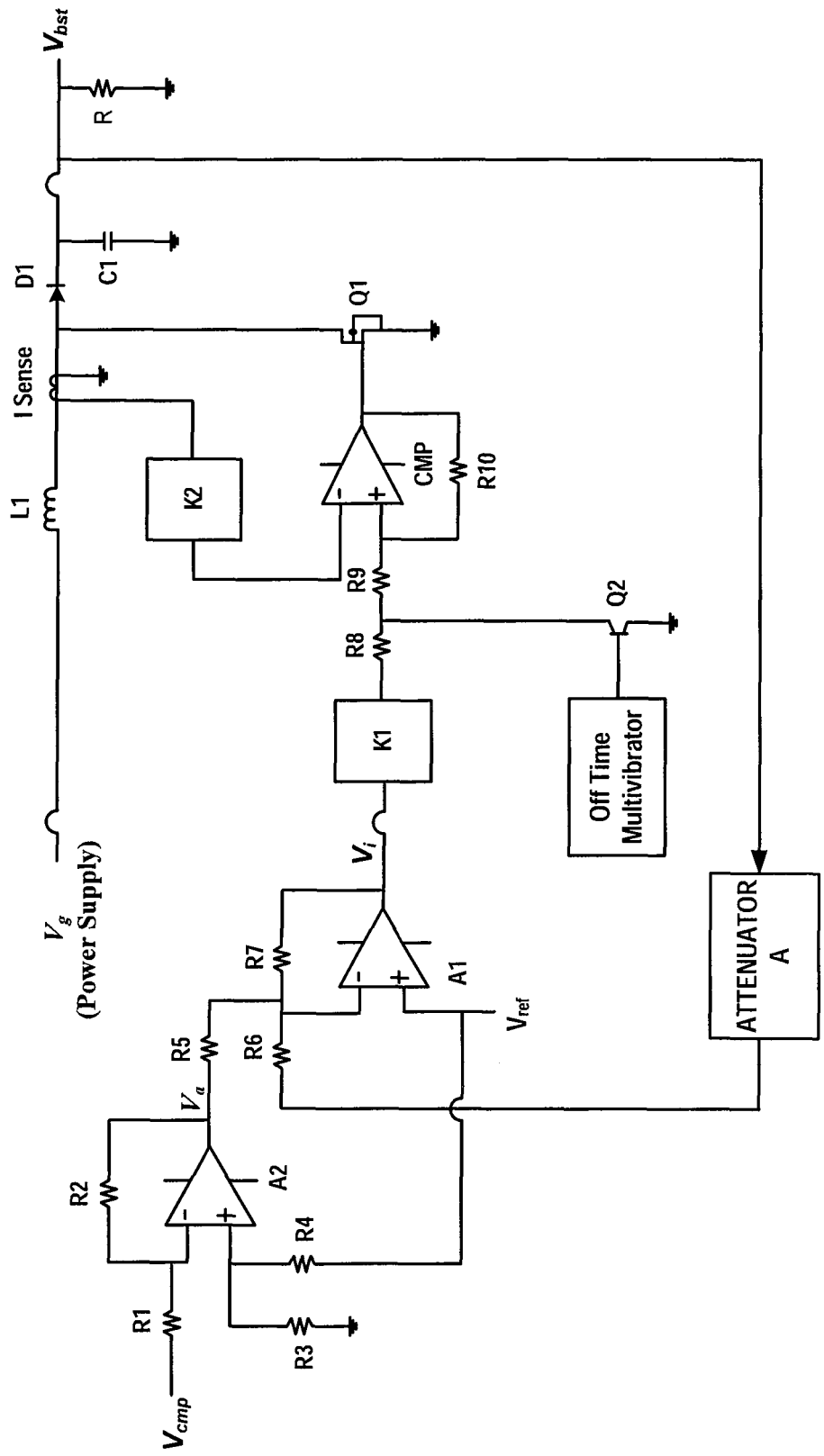
FIG. 4 illustrates a topology in accordance with an embodiment using a hysteretic boost circuit.

With reference to FIG. 4, switched mode power amplifier 400 is illustrated. As is evident from FIG. 4, switched mode power amplifier 400 depicts an embodiment consistent with the functional description given herein with respect to FIG. 3. Switched mode power amplifier 400 comprises an amplifier network that receives a DC voltage input and a DC voltage feedback, a translation stage, an off-time multivibrator, and an attenuator.

With continued reference to FIG. 4, an amplifier network is illustrated comprising resistors R1-R7 and amplifiers A1 and A2. $V_{cmp}$ represents voltage received by R1 that is connected to the negative terminal of amplifier A2. The positive terminal of amplifier A2 is connected to resistors R4 and R5. Resistor R2 is in electrical communication with resistors R5, R6 and R7. The negative terminal of amplifier A1 is in electrical communication with resistors R6 and R7. The positive terminal of amplifier A1 is connected to reference voltage $V_{ref}$. The output of amplifier A1 is $V_i$, which is passed to resistor attenuator K1.

With continued reference to FIG. 4, a translation stage is illustrated comprising resistor attenuators K1 and K2 and resistors R8 and R9. Resistor attenuators K1 and K2 are biased. Resistor attenuator K1 receives $V_i$. Resistor attenuator K1 maps the voltage of $V_i$ to a more limited range, prior to passing the voltage to resistors R8 and R9. Resistor attenuator K2 receives the current sense waveform of $V_g$ from 1 sense. As shown, $V_g$ is in electrical communication with the input to an inductor L1. The output of inductor L1 is in electrical communication with the input of Diode D1. I sense may be any suitable current sensor. I sense may be located between the output of L1 and the input of D1 so as to sense the current through L1. Resistor attenuator K2 maps the voltage of $V_g$ to a more limited range.

With continued reference to FIG. 4, a voltage boost converter is illustrated. The voltage boost converter of FIG. 4 is a hysteretic boost circuit comprising inductor L1, switch Q1, comparator CMP, capacitor C1, and resistor R. The output of resistor attenuator K1 is passed through resistors R8 and R9 before entering the positive terminal of comparator CMP. The voltage output of resistor attenuator K2 is connected to the negative terminal of comparator CMP. The hysteretic boost circuit receives $V_g$ and the output of comparator CMP. The hysteretic boost circuit outputs $V_{bst}$. As illustrated, comparator CMP operates switch Q1 based upon the voltage received from resistor attenuator K1 and resistor attenuator K2.

As illustrated in FIG. 4, an off-time multivibrator is shown. In various embodiments, such as that depicted in FIG. 4, the off-time multivibrator may be configured to connect to the translation stage between resistor R8 and resistor R9 by way of switch Q2.

In various embodiments, DC feedback voltage may be received by attenuator A, with the output sent to the amplifier network. As depicted in FIG. 4, attenuator A receives DC feedback voltage from the hysteretic boost circuit and outputs voltage to R6 of the amplifier network.

As discussed above, the use of an off-time multivibrator with a hysteretic boost circuit provides performance benefits. Multivibrators may take the form of astable, bistable, and monostable. In various embodiments, the off-time multibivrator is astable. For example, the off-time multivibrator provides frequency regulation so that dead time may be predicted, especially under heavy loads. While preferred embodiments employ an off-time multivibrator, it should be understood that various embodiments do not include an off-time multivibrator.

Figure 5:
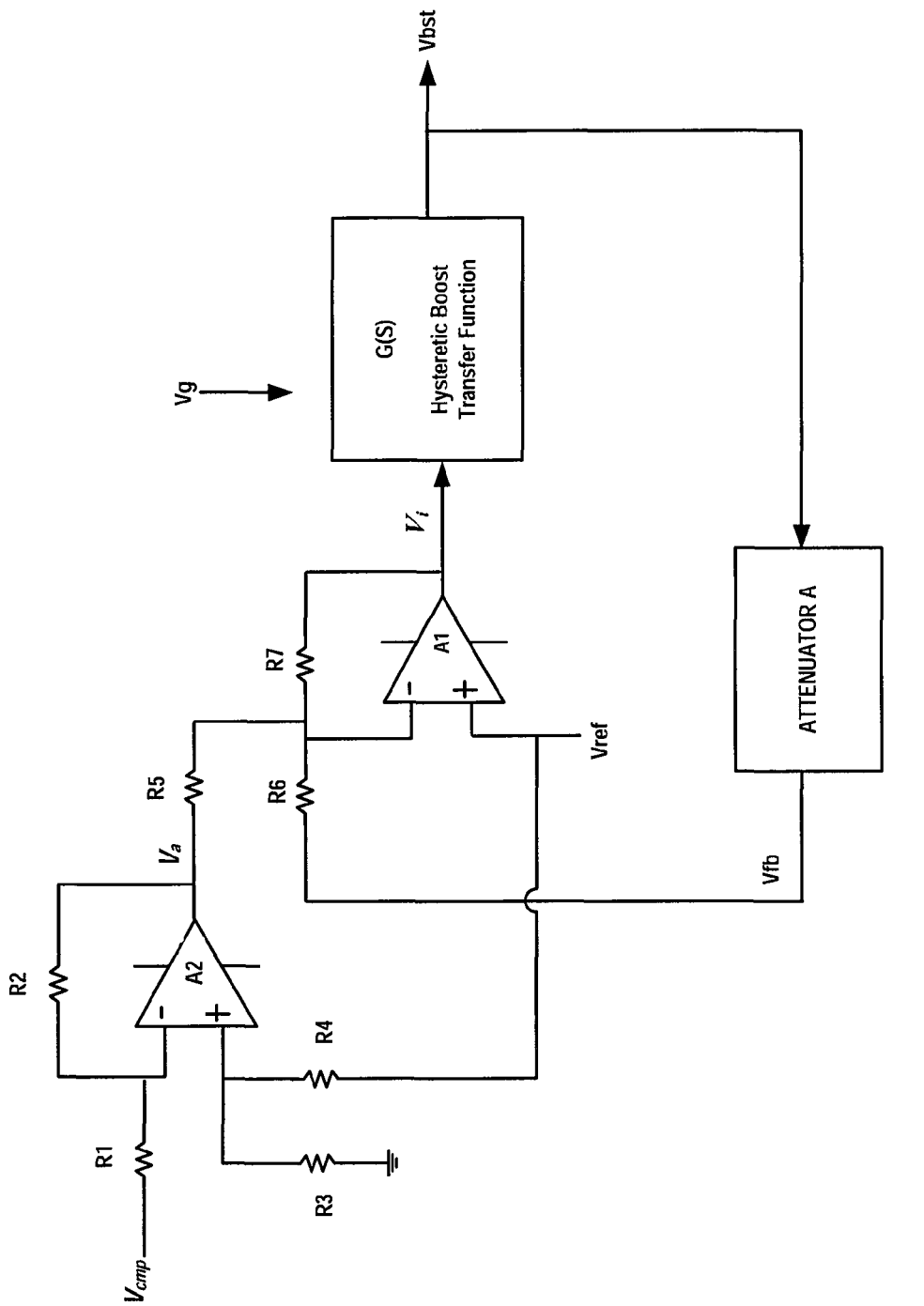
FIG. 5 illustrates a topology in accordance with an embodiment using a hysteretic boost circuit without an off-time multi-vibrator.

For example, with reference to FIG. 5, a switched mode power amplification circuit is illustrated. An amplifier network comprising amplifiers A1 and A2 and resistors R1-R7 is shown in electrical communication with a hysteretic boost circuit G(S). The amplifier network outputs $V_i$ to the hysteretic boost circuit G(S).

The hysteretic boost circuit G(S) receives $V_i$ and $V_g$ and outputs amplified voltage $V_{bst}$. Attenuator A receives DC feedback voltage from hysteretic boost circuit G(S) and outputs a voltage $V_{fb}$ to the amplifier network at R6.

In various embodiments, a PWM controller is used to perform voltage boost in place of a hysteretic boost circuit. The PWM controller provides regular frequency output. Thus, in various embodiments having a PWM controller, the desirability of an off-time multivibrator may be reduced or eliminated.

Figure 6:
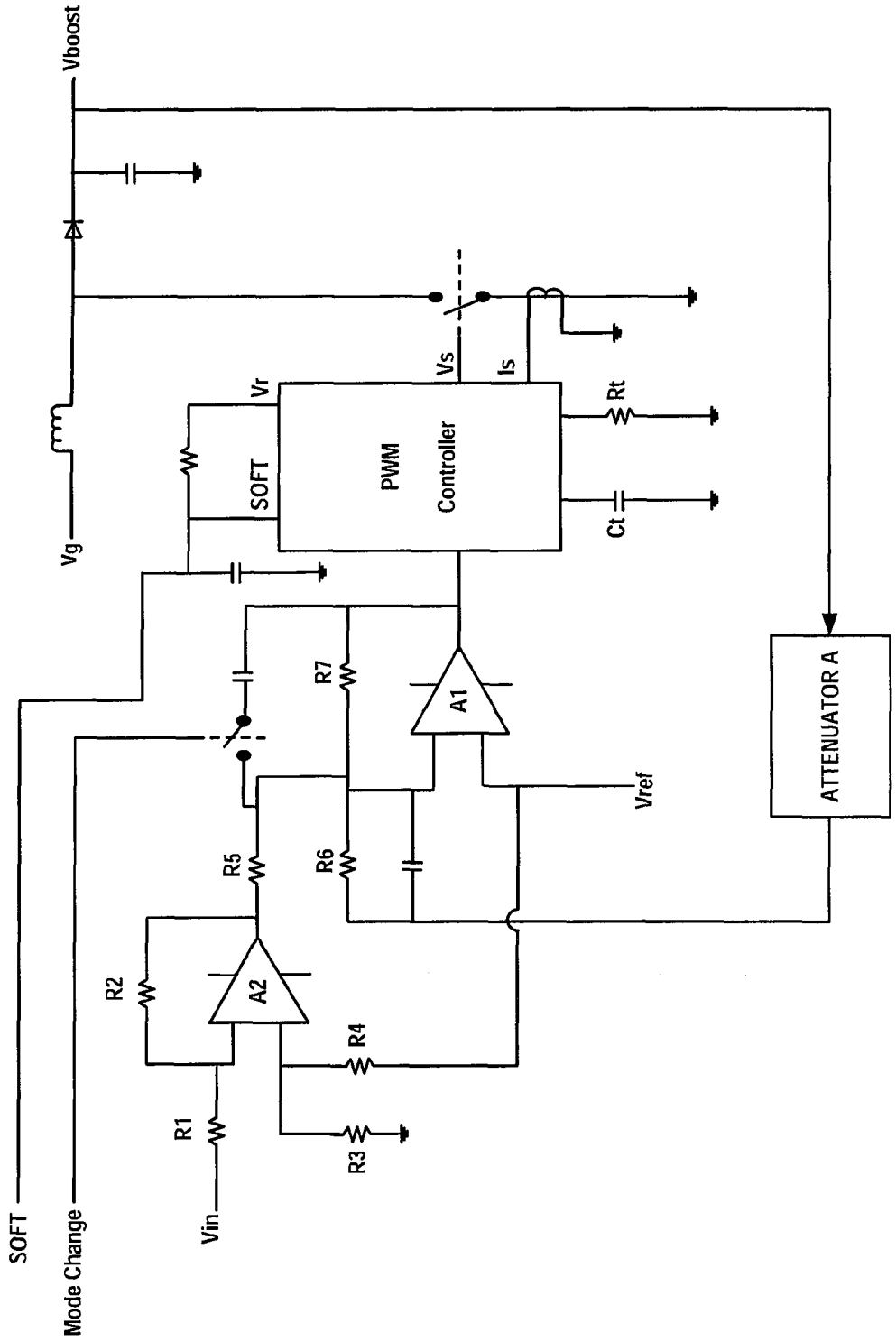
FIG. 6 illustrates a topology in accordance with an embodiment using a PWM controller.

For example, with reference to FIG. 6, a switched mode power amplification circuit is illustrated comprising a PWM controller. An amplifier network comprising amplifier A1, amplifier A2, and resistors R1-R7 is illustrated in electrical communication with a PWM controller. PWM controller provides voltage boost to $V_g$. DC feedback voltage is provided to attenuator A to in turn provide feedback to the amplifier network.

From a theoretical perspective, various transfer functions of various embodiments may be derived. It should be understood that the transfer functions for embodiments having a PWM controller may be very different than transfer functions for embodiments having a hysteretic voltage boost circuit. For example, the following relationship may be derived from the embodiment illustrated in FIG. 4:

$$V_{bst}(\infty) \cong \frac{V_{ref}}{A}$$

where A=voltage feedback attenuator and $V_{ref}$=reference voltage.

In addition, the following relationship may be derived from the embodiment illustrated in FIG. 4:

$$\frac{V_{bst}(0)}{V_{cmp}(0)} \cong \frac{R_6}{R_5 A}$$

where A=voltage feedback attenuator, $V_{cmp}$=input voltage to the amplifier network, and $R_5$ and $R_6$ represent resistor $R_5$ and resist $R_6$.

For testing and verification purposes, a conventional hysteretic boost function is tested against a switched mode power amplifier. For testing purposes, a switched mode power amplifier substantially similar to the embodiment illustrated in FIG. 4 is used. The results are shown in TABLE 1.

TABLE 1

Comparison Data for Conventional Hysteretic Boost Function and Switched Mode Power Amplifier

|  | Line Regulation (%) | Vout vs. Load (Volts) Vi/Vcmp Constant | | Gain vs. Load (V/V) | | Dominant Pole vs Load (Hz) | |
| --- | --- | --- | --- | --- | --- | --- | --- |
|  |  | 4 Ohm | 41.7 Ohms | 4 Ohm | 41.7 Ohms | 4 Ohm | 41.7 Ohm |
| Hysteretic Boost Function | 26 | 43 | 132 | 4 | 24 | 96 | 10 |
| Switched Mode Power Amplifier | 2 | 48 | 49 | 4 | 4 | 1162 | 1305 |

As shown in TABLE 1, the measurement parameters show that a switched mode power amplifier provides a significant improvement over a conventional hysteretic boost function. For example, line regulation for the switched mode power amplifier is 13 times better (i.e., 2% to 26%) than the conventional hysteretic boost function alone. In addition, using the conventional hysteretic boost function, $V_{out}$ changes from 43 V to 132 V when the load is switched from 4Ω to 41.7Ω, while the input $V_i$ is held constant for the boost function. In contrast, using a switched mode power amplifier $V_{out}$ changes from 48 V to 49 V when the load is switched from 4Ω to 41.7Ω, while the input $V_{cmp}$ is held constant.

Also, the conventional hysteretic boost function exhibits a gain ($V_{bst}/V_i$) change from 4 V/V to 24 V/V when the load is switched from 4Ω to 41.7Ω. In contrast, using a switched mode power amplifier, the gain ($V_{bst}/V_{cmp}$) does not change when the load is switched from 4Ω to 41.7 Ω.

Figure 7:
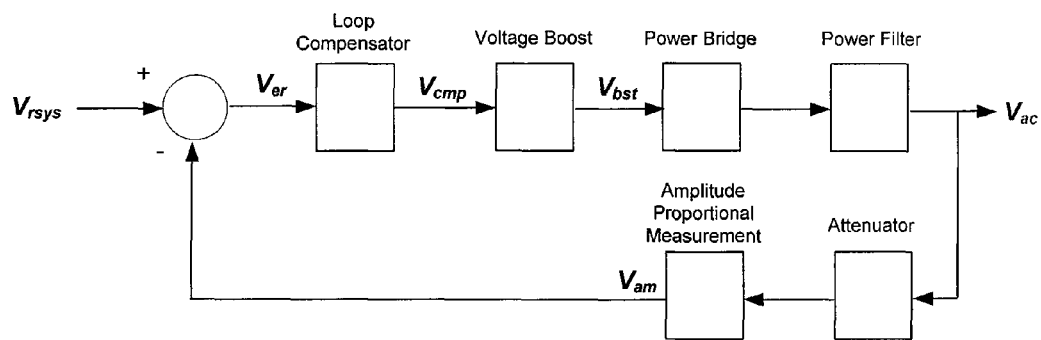
FIG. 7 illustrates an application of a switched mode power amplifier in a DC to AC inverter.

These performance improvements of the switched mode power amplifier over the conventional hysteretic boost function may result in a significant improvement in any application where a well controlled voltage at significant power levels is desired, such as in the context of a DC to AC inverter. For example, with reference to FIG. 7, a DC to AC inverter is shown. Loop compensator receives voltage $V_{er}$ and outputs voltage $V_{amp}$. The voltage boost shown in FIG. 7 is illustrated in a position where a conventional system would use a conventional voltage boost circuit. However, a switched mode power amplifier as described herein, could be used in place of the voltage boost shown in FIG. 7 to improve performance. The voltage boost of FIG. 7 outputs voltage $V_{bst}$ to a power bridge, which in turn outputs to a power filter, thereby producing $V_{ac}$.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A circuit comprising:
   an amplifier network;
   a DC translation stage for receiving input voltage from the amplifier network and for providing an output voltage to a voltage boost circuit; and
   a feedback network for providing feedback from the voltage boost circuit to the amplifier network,
   wherein the voltage boost circuit is hysterically controlled,
   wherein the DC translation stage comprises a first resistor attenuator and a second resistor attenuator,
   wherein the first resistor attenuator receives a voltage representative of the current detected by a current sensor for sensing a voltage source of the voltage boost circuit, and
   wherein the first resistor attenuator receives a voltage representative of the current detected by a current sensor for sensing a voltage source of the voltage boost circuit.

2. The circuit of claim 1, wherein the amplifier network comprises two amplifiers and seven resistors.

3. The circuit of claim 1, wherein the feedback network comprises an attenuator.

4. The circuit of claim 1, wherein the voltage boost circuit comprises a comparator, a switch and an inductor.

5. The circuit of claim 4, further comprising an off-time multi-vibrator in electrical communication with the comparator.

6. The circuit of claim 1, wherein the second resistor attenuator receives a voltage from the amplifier network.

7. The circuit of claim 1, wherein the voltage boost circuit is a PWM controller.

8. A method comprising:
   receiving a DC feedback voltage and a DC control voltage at an amplifier network, wherein the amplifier network comprises an amplifier and a plurality of resistors;
   passing an output DC voltage from the amplifier network to a DC translation stage; and
   passing a DC translation stage output voltage to a voltage boost circuit;
   producing the DC feedback voltage by a feedback network; and
   receiving, at the DC translation stage, a voltage representative of the current detected by a current sensor for sensing a voltage source of the voltage boost circuit,
   wherein the voltage boost circuit is hysterically controlled.

9. The method of claim 8, wherein the feedback network comprises an attenuator.

10. The method of claim 8, wherein the voltage boost circuit comprises a PWM controller.

11. The method of claim 8, wherein the voltage boost circuit comprises a comparator, a switch, and an inductor.

12. The method of claim 11, further comprising modulating the comparator by an off-time multi-vibrator, 13. The method of claim 12, wherein the DC translation stage comprises a first resistor attenuator and a second resistor attenuator.

14. The method of claim 13, wherein the second resistor attenuator of receives a voltage from the amplifier network.

* * * * *